United States Patent [19]

Katano

[11] Patent Number: 5,502,526
[45] Date of Patent: Mar. 26, 1996

[54] CAMERA

[75] Inventor: Yuji Katano, Kawasaki, Japan

[73] Assignee: Nikon Corporation, Tokyo, Japan

[21] Appl. No.: 483,967

[22] Filed: Jun. 7, 1995

Related U.S. Application Data

[63] Continuation of Ser. No. 219,854, Mar. 30, 1994, abandoned, which is a continuation of Ser. No. 973,750, Nov. 9, 1992, abandoned.

[30] Foreign Application Priority Data

Nov. 20, 1991 [JP] Japan .................................. 3-305043

[51] Int. Cl.$^6$ ................................................... G03B 17/02
[52] U.S. Cl. ........................ 354/288; 354/289.12
[58] Field of Search ............................ 354/288, 289.12

[56] References Cited

U.S. PATENT DOCUMENTS

| | | | |
|---|---|---|---|
| 4,297,018 | 10/1981 | Murakami et al. | 354/288 |
| 4,647,170 | 3/1987 | Stoneham | 354/288 |
| 4,705,372 | 11/1987 | Lapeyre | 354/106 |
| 4,751,538 | 6/1988 | Konno | 354/288 |
| 4,832,275 | 5/1989 | Robertson . | |
| 4,896,178 | 1/1990 | Ohmura et al. | 354/288 |
| 4,926,207 | 5/1990 | Eguchi et al. | 354/288 |
| 5,081,482 | 1/1992 | Miki et al. | 354/288 |
| 5,140,354 | 8/1992 | Burnham | 354/288 |

*Primary Examiner*—Monroe H. Hayes
*Attorney, Agent, or Firm*—Oliff & Berridge

[57] ABSTRACT

A camera is proposed with which, without a light blocking member on the rear of a film exposure portion needing to be dismounted from the camera body, testing and adjustment can be performed by opening up the rear of the film exposure portion, so that the camera can desirably be tested and adjusted while being operated. The camera includes a camera body formed with a film exposure portion a rearward portion of which is formed as an opening, a light interception member which closes over the opening, a pressure plate which is provided on the light interception member, a main electrical circuit which is provided between the pressure plate and the light interception member, and camera housings, which enclose the camera body and the light interception member. Loading and removal of a film cartridge is possible with the light interception member fitted, and the light interception member is rotatably attached with respect to the camera body by a hinge portion provided at an edge portion of the light interception member.

8 Claims, 4 Drawing Sheets

CAMERA

This is a Continuation of application Ser. No. 08/219,854 filed Mar. 30, 1994, now abandoned, which in turn is a continuation of U.S. application Ser. No. 07/973,750, filed Nov. 9, 1992, now abandoned.

BACKGROUND OF THE INVENTION

1. Field of the Invention

The present invention relates to a camera which has a film exposure portion with a rear opening which is covered over by a light blocking member.

2. Description of the Related Art

A camera and a film cartridge have been proposed (for example, refer to U.S. Pat. No. 4,832,275) in which the winding on action of the film is performed by forwarding it out from the film cartridge by the rotation of a spool on the film cartridge rather than by winding on the film by the rotation of a take up spool provided in a spool chamber; in other words, by pushing the film rather than by pulling it.

With this type of camera, the operation of pulling out the leader portion of the film from the film cartridge and feeding it onto the take-up spool is not necessary as it was with a prior art type camera, and it is not necessary to provide a construction like a prior art rear camera lid for opening the film exposure portion. Because of this, the rear side of the film exposure portion is completely closed by a light interception member, and a pressure plate, which in the prior art was fixed on the rear camera lid, is instead fixed to this light interception member.

With a camera as described above, if during the process of testing after the camera has been manufactured it is desired to readjust the focusing of the lens or to test and adjust the exposure amount, etc., it is necessary to open the rear of the film exposure portion. Accordingly, the light interception member is made to be demountable from a camera body, and during testing it is necessary to remove this light interception member which was fixed to the camera during manufacture; and thus the number of processes involved in the process of testing is increased by the operation of dismounting the light interception member from the camera.

SUMMARY OF THE INVENTION

The object of the present invention is to propose a camera with which testing and adjustment can be performed by opening up the rear of the film exposure portion, without the light interception member being required to be dismounted rearwards from the camera body away from the film exposure portion.

In order to attain the above described object, the present invention proposes a camera comprising: a camera body formed with a film exposure portion, a rearward portion of which is formed as an opening and at a frontward portion of which a lens is fitted; a light blocking member which closes over the opening of the camera body; a pressure plate which is attached to the side of the light blocking member which faces the film exposure portion, and which, when an appropriate film is being forwarded past the film exposure portion, controls the position of the surface of the film; and, a camera housing which encloses the camera body and the light blocking member; where in, loading and removal of a film cartridge is possible with the opening in the camera body remaining closed by the light blocking member; and the light blocking member is rotatably attached with respect to the camera body by a hinge portion provided at an edge portion of the light blocking member.

According to the present invention as defined above, because the light blocking member is rotatably attached with respect to the camera body by the hinge portion, when it is desired to perform testing and adjustment, it is only necessary to pivot the light blocking member away from the camera body so as to leave the film exposure portion laid open, and thereby it is possible to perform testing and adjustment without any requirement for dismounting the light blocking member from the main body of the camera.

It is possible to provide a main electrical circuit between the above described pressure plate and the above described light blocking member, and to provide a secondary electrical circuit which is separate from the main electrical circuit and which is housed within the camera body. In this case, the main electrical circuit and the secondary electrical circuit should be electrically connected together by a wiring member which has a certain resilience. With this construction, when the light blocking member is rotated relative to the camera body to lay open the rear side of the film exposure portion, it is possible to perform testing and adjustment while operating the camera.

The rotational axis of the hinge portion of the light exclusion member may extend in the direction parallel to the direction of forwarding of the film, or alternatively may extend in a direction not parallel to the direction of forwarding of the film, such as the perpendicular direction thereto.

If the rotational axis of the hinge portion of the light blocking member extends in the direction parallel to the direction of forwarding of the film, and also the main electrical circuit and the secondary electrical circuit are electrically connected together by the above described resilient wiring member, then the width of the portion of this wiring member which passes the hinge portion and which is resiliently bent to and fro when the light blocking member is rotated relative to the camera body can be quite extensive, and thus it is possible for extensive circuitry to be connected across this resilient portion.

The above described wiring member may be provided so as to be deformable about the rotational axis of the hinge portion of the light exclusion member. And also this wiring member may be a flexible printed circuit. Further, testing contacts of this flexible printed circuit may be exposed in the side of the light blocking member to which the pressure plate is attached, so that, during testing, signals to be transmitted to the camera body may be used for fault diagnosis or the like. Further, when the opening of the camera body is closed by the light blocking member, by the testing contacts exposed in the side of the light blocking member being brought into contact with contacts of another electrical circuit housed in the camera body, thereby when the camera is being used signal transmission between the other electrical circuit, the main electrical circuit and the secondary electrical circuit is possible.

DETAILED DESCRIPTION OF THE PREFERRED EMBODIMENTS

Figure 1:
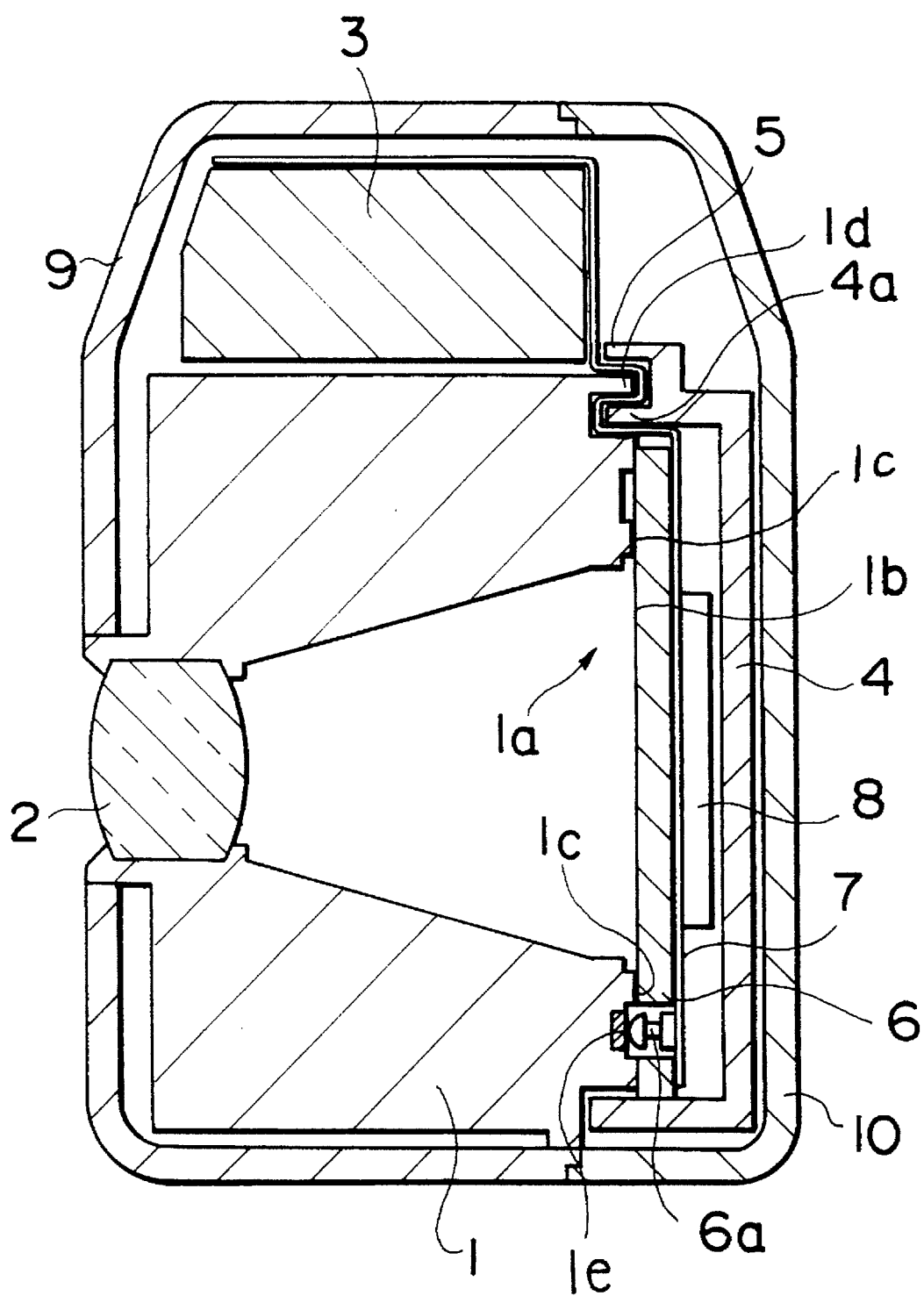
FIG. 1 is a sectional view showing a camera which is a first preferred embodiment of the present invention.
Figure 2:
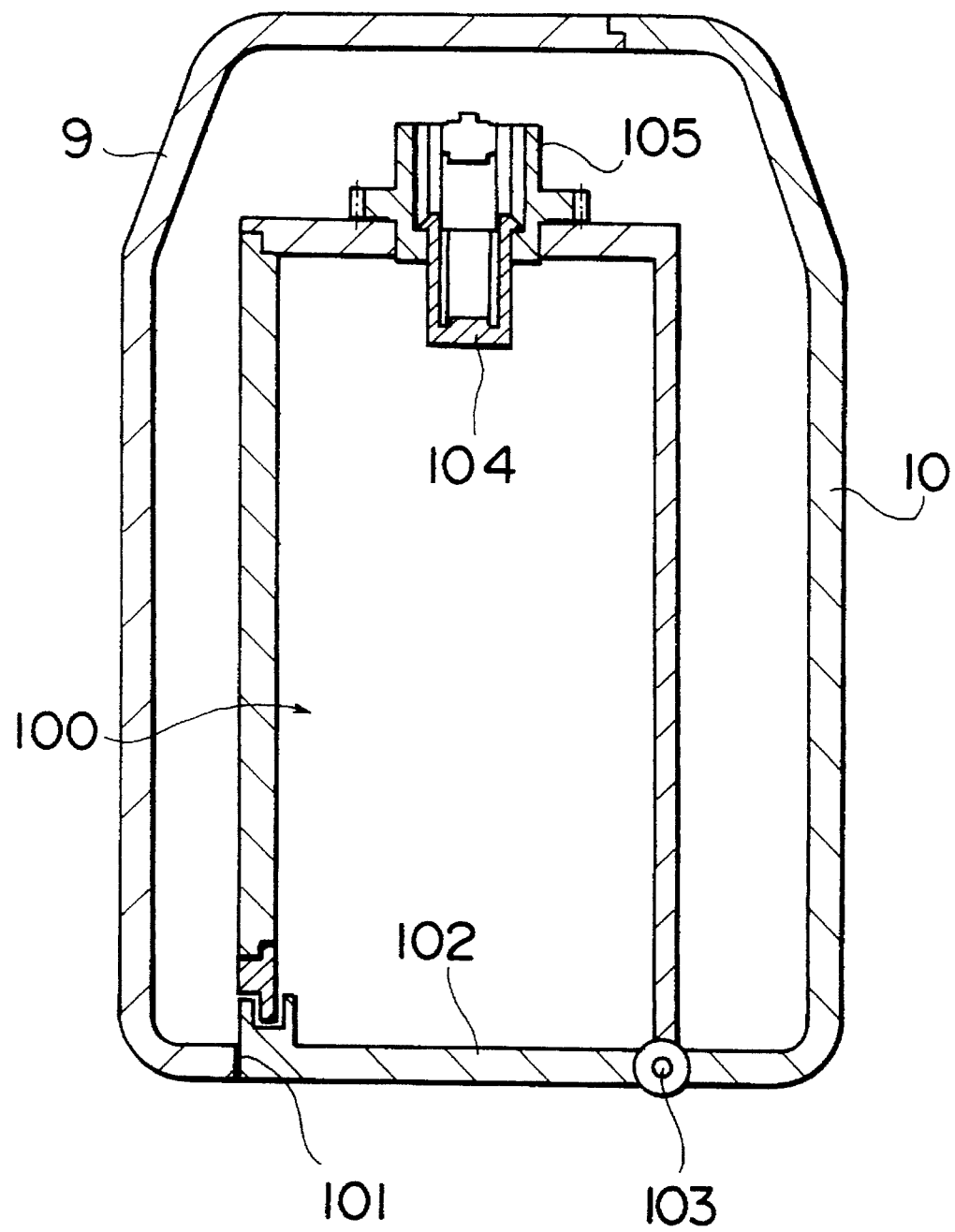
FIG. 2 is a sectional view of a cartridge chamber of the camera shown in FIG. 1.

FIGS. 1 and 2 are sectional views showing a first preferred embodiment of the camera of the present invention. As shown in FIG. 2, within the camera according to this embodiment there is defined a cartridge chamber 100 in which is loaded a film cartridge (not shown in the figures) of a type whose film is forwarded, i.e is wound on and/or rewound, by the rotation of a spool provided therein, and the bottom portion of this cartridge chamber 100 opens to the outside through an opening 101, via which a film may be loaded into the cartridge chamber 100. The reference numeral 102 denotes a lid, fitted over the opening 101, which is pivotably mounted on a pin 103 and is rotatable so as either to close the opening 101 or to leave it open. And a spool 104 is provided at the upper end portion in the figure of the cartridge chamber 100 so as to fit into and be engaged with the spool of a film cartridge (not shown) loaded into the cartridge chamber 100. When the spool 104 is rotated by a film forwarding device (not shown in the figures) via a toothed wheel portion 105 provided on the outside of the spool 104, the film (also not shown) within the film cartridge is forwarded.

Referring to FIG. 1, the reference numeral 1 denotes the camera body, and in its front surface (the left side thereof as seen in the FIG. 1) there is fixed a lens 2. In the rear portion of the camera body 1 (the right side thereof as seen in the FIG. 1) there is formed a film exposure portion 1a, the rear end portion of which is formed as an opening 1b. A film (not shown in the figures) is passed across the opening 1b of the film exposure portion 1a in the left and the right directions of the camera (in the direction perpendicular to the plane of the drawing paper in FIG. 1). At the upper portion of the camera body 1 there is provided a secondary electrical circuit, or a range finder/exposure meter device 3.

The reference numeral 4 denotes a light interception member which closes over the opening 1b. The transverse cross section of this light interception member 4 is formed in the shape of the character "]" from the point of view of the figure, and the light interception member 4 is pivotally attached to the camera main body 1 by a hinge portion 5 provided on the upper edge portion of the light interception member 4. The rotational axis of the hinge portion 5 extends parallel to the direction of forwarding of the film (perpendicular to the plane of the drawing paper in FIG. 1), and the light interception member 4 is rotatable around this rotational axis.

The reference numeral 6 denotes a pressure plate which is provided integrally with the light interception member 4 on the side thereof which faces the film exposure portion 1a. This pressure plate 6, in cooperation with rail portions 1c formed on the rear portion of the camera body 1, sandwiches and supports a film (not shown in the figures) forwarded into the film exposure portion 1a and controls the position of the surface of the film.

The reference numeral 7 denotes a flexible printed circuit (hereinafter termed a FPC). The lower portion of the FPC 7 is fixed to the rear surface (the back portion) of the pressure plate 6 so as to be integral therewith. The upper portion of the FPC 7 extends through and past the hinge portion 5 and is fixed to a surface of the range finder/exposure meter device 3. A main electrical circuit 8 which performs control of the camera is fixed on the rear surface of the pressure plate 6, sandwiching the FPC 7 between itself and the pressure plate 6. A concave portion 4a is formed on the upper portion of the light interception member 4 and a convex portion 1d is formed on the opposing upper portion of the camera body 1, and concave portion 4a and this convex portion 1d are adapted mutually to engage with one another. The FPC 7 extends along the surface of the light interception member 4 and is bent to and fro around its concave portion 4a, and when the light interception member 4 is rotated relative to the camera body 1 around the axis of the hinge portion 5, the portion of the FPC 7 around the concave portion 4a is easily bent and deformed to follow this rotation. Contact members 6a are provided on the front surface of the pressure plate 6 for testing the FPC 7. When the light interception member 4 is in the closed condition and is pressed against the camera body 1, these contact portions 6a are brought into contact with contacts 1e of another electrical circuit, for example a focus adjustment circuit, which is housed internally to the camera body 1. In this way, when the camera is in use, the other electrical circuit, the main electrical circuit 8, and the range finder/exposure meter device 3 are mutually connected via the FPC 7, and signals can be transmitted between them via said FPC 7.

The reference numerals 9 and 10 respectively denote a front housing portion and a rear housing portion which together constitute the camera housing of the camera and define its appearance. The camera body 1 and the light interception member 4 are enclosed with the front housing portion 9 and the rear housing portion 10.

Figure 3:
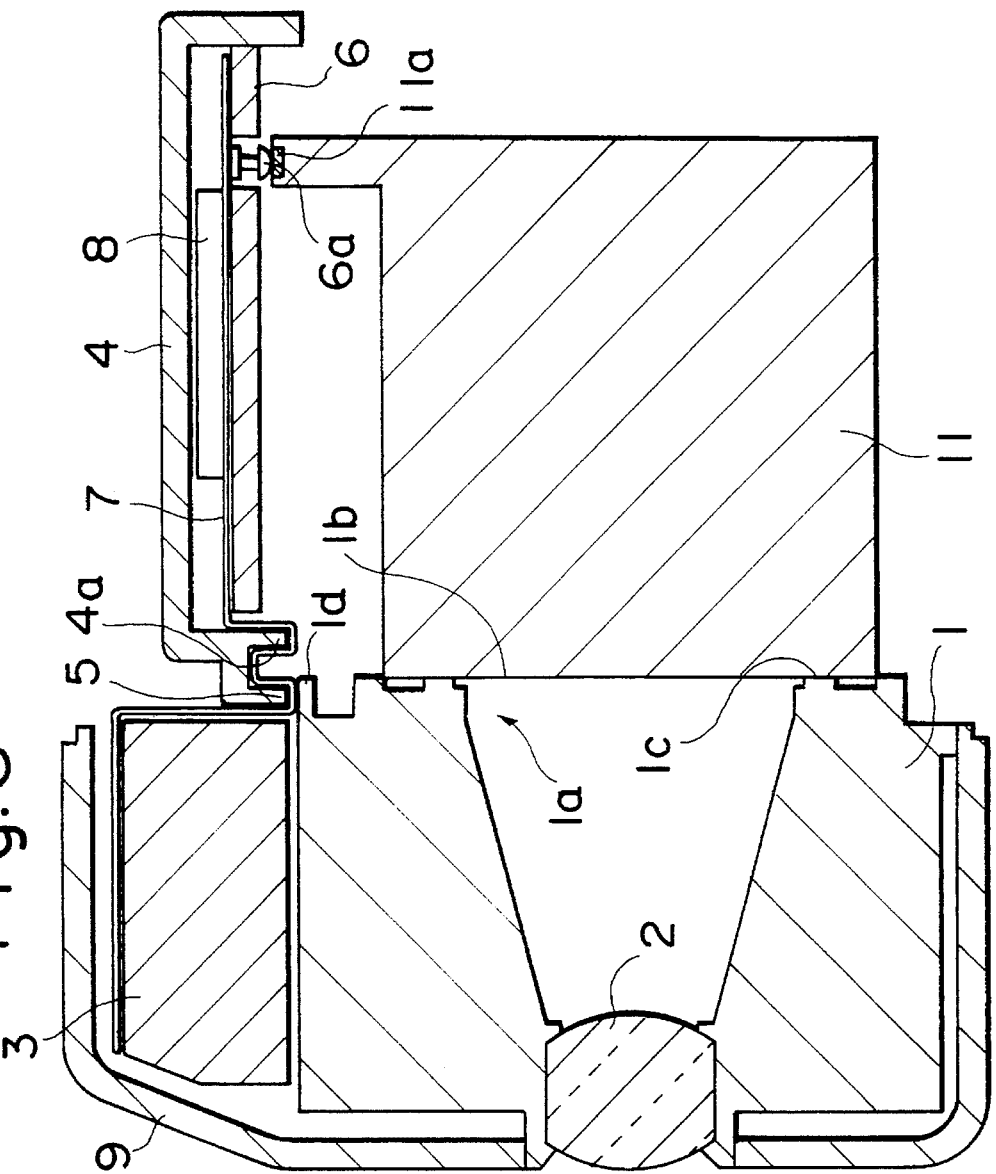
FIG. 3 is a sectional view showing this first preferred embodiment camera in the opened condition, ready for testing and adjustment.

FIG. 3 is a sectional view showing this camera in the opened condition, ready for testing and adjustment. In the condition shown in FIG. 3, the rear housing portion 10 has been removed and is therefore not shown, and the light interception member 4 has been pivoted in the upwards direction around the hinge portion 5, together with the pressure plate 6 integral with the light interception member 4, the FPC 7, and the main electrical circuit 8, and thereby the film exposure portion 1a is opened to the outside through the opening 1b. And a testing and adjustment device 11 is shown in the figure as abutted against the rear portion of the camera body 1, so as to close up the opening 1b therein. This testing and adjustment device 11 performs testing and adjustment of the exposure setting, etc., and readjustment of the focusing of the lens 2 while operating the camera. Contact points 11a on the testing and adjustment device 11 are brought into contact with the contact members 6a on the pressure plate 6, and thereby signals can be transmitted between the testing and adjustment device 11 and the circuitry which is housed in the camera (for example the main electrical circuit 8).

According to this first preferred embodiment, by the light interception member 4 being pivoted upwards around the hinge portion 5 when testing and adjustment are to be performed, it is possible to leave the film exposure portion 1a exposed to the outside, and thus it is possible to perform testing and adjustment of the camera, without any requirement for performance of the troublesome process of removal and reattachment of the light interception member 4. Because the main electrical circuit 8 and the range finder/ exposure meter device 3 remain mutually connected via the FPC 7 even when the light interception member 4 is thus pivoted upwards around the hinge portion 5, it is possible to perform testing and adjustment while actually operating the camera. Because at this time the light interception member 4 is rotated around the axis of the hinge portion 5 which extends in the direction parallel to the direction of forwarding of the film and is therefore able to be quite long, thereby the portion of the FPC 7 across its width which passes the hinge portion 5 and is bent to and fro for such rotation is quite extensive, and thus it is possible for extensive circuitry on the FPC 7 to be connected across this flexible portion thereof. Because the FPC 7 is deformable about the rotational axis of the hinge portion 5 even when the light interception member 4 is rotated, the FPC 7 does not interfere in testing and adjustment the camera. The length of the portion of the FPC 7 which is necessary for communication between the main electrical circuit 8 and the range finder/exposure meter device 3 is almost constant, and does not depend upon the rotational position of the light interception member 4, and accordingly transmission of signals between these devices is unaffected by the rotation of the light interception member 4.

Figure 4:
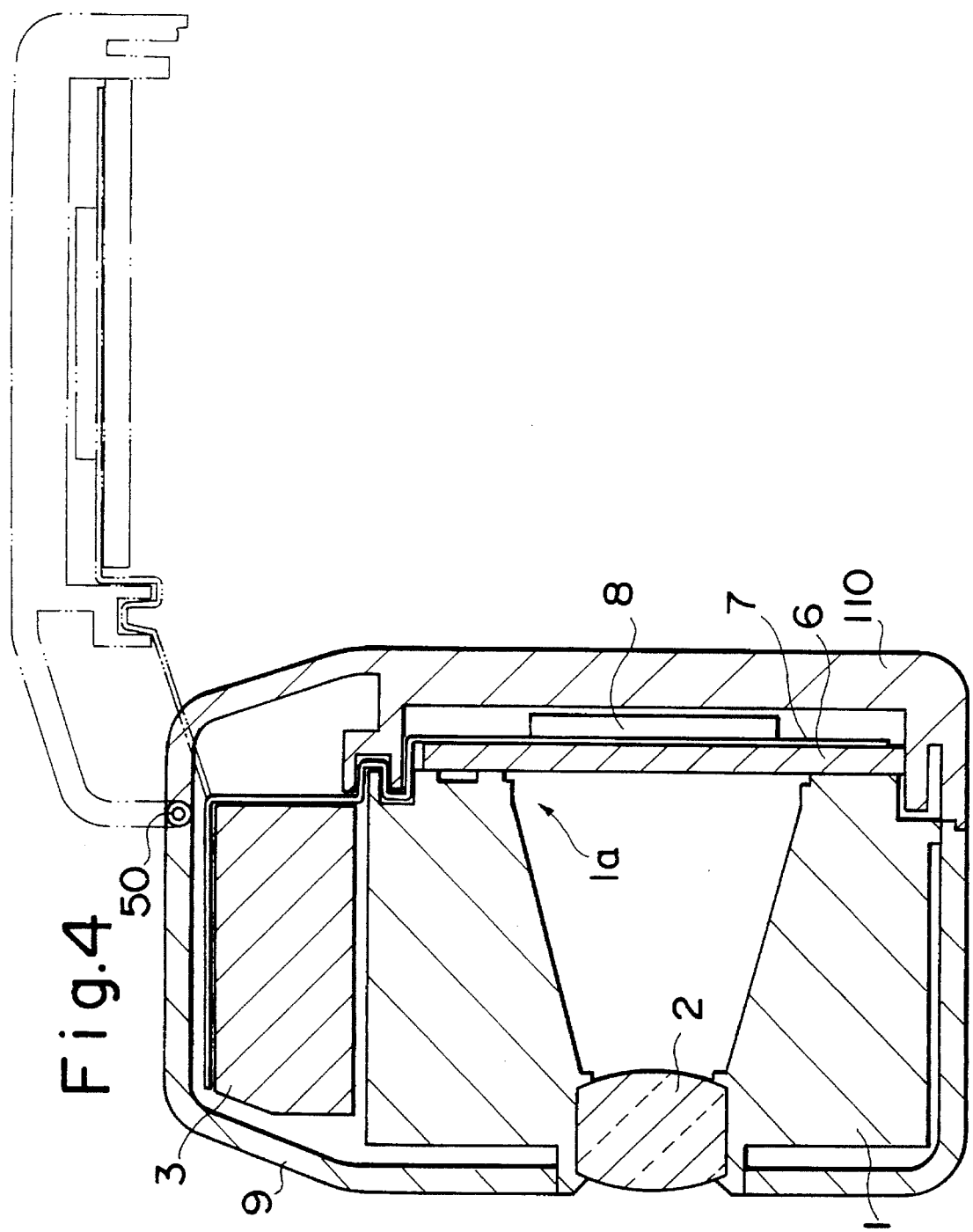
FIG. 4 is a sectional view, showing a camera which is a second preferred embodiment of the present invention.

The camera according to the present invention is not to be considered as being limited to the preferred embodiment which has been described above in detail, because it is possible to conceive of various alterations. In FIG. 4 there is shown a second preferred embodiment in which the light exclusion member 4 and the rear housing portion 10 are formed integrally with one another. In this embodiment, a rear housing portion 110 formed integrally with a light interception member 4 is pivotally fitted to the front housing portion 9 via a hinge portion 50 provided on its front upper edge portion. The broken line in FIG. 4 shows the position of the rear housing portion 110 when it has been pivoted, together with the pressure plate 6, the FPC 7, and the main electrical circuit 8, in the upward direction around the hinge portion 50 as an axis.

Although in the two above described preferred embodiments of the present invention the range finder/exposure meter device 3 and the main electrical circuit 8 have been connected together via the FPC 7, this is not to be considered as limitative of the present invention, and other wiring means for connecting together these two elements—for example lead wires—may be considered within the scope of the invention. Further, the present invention is not limited to the construction in which the rotational axis (of the hinge portion 5 or 50) around which the light interception member 4 is pivoted to the camera body 1 extends parallel to the direction of forwarding of the film; it could also, for example, be perpendicular thereto, or indeed might be skew thereto.

What is claimed is:

1. A camera comprising:

a camera body having a film exposure portion, a cartridge chamber provided apart from said film exposure portion, and an opening at a rearward portion of said camera body, wherein film is adapted to be forwarded in the body in a film forwarding direction, a light blocking member, separate from said camera body that closes said opening, said light blocking member having an edge portion extending in a direction parallel to said film forwarding direction, a first electrical circuit being supported on said light blocking member, a second electrical circuit, separate from said first electrical circuit, being housed within said camera body, and, a resilient wiring member electrically connecting together said first electrical circuit and said second electrical circuit, wherein said wiring member is wired through said edge portion of said light blocking member, and said light blocking member being rotatable between a closed position, in which said opening is closed, and an open position, in which said opening is opened, deforming said wiring member.

2. A camera according to claim 1, further comprising:

a pressure plate being attached to a first side of said light blocking member, the first side facing said film exposure portion, wherein, when an appropriate film is forwarded past said film exposure portion said pressure plate controls the positions a surface of said film, and said first electrical circuit is positioned between said pressure plate and said light blocking member.

3. A camera according to claim 1, wherein said wiring member is a flexible printed circuit.

4. A camera according to claim 3, wherein the flexible printed circuit includes testing contacts, the testing contacts being exposed in a first side of said light blocking member facing said film exposure portion.

5. A camera according to claim 4, further including a third electrical circuit housed in the camera body and having contacts, wherein when said opening of said camera body is closed by said light blocking member, said testing contacts are brought into contact with said contacts of said third electrical circuit housed in said camera body, said third electrical circuit, said first electrical circuit and said second electrical circuit being connected together.

6. A camera according to claim 5, wherein, when said opening of said camera body is open for testing and adjustment of the camera, said testing contacts being exposed in the first side of said light blocking member, and said contacts of said third electrical circuit housed in said camera body can be brought into contact with respective contacts of a testing and adjusting apparatus.

7. A camera comprising:

a camera body having a film exposure portion, a cartridge chamber provided apart from said film exposure portion, and an opening at a rearward portion of said camera body, wherein film is adapted to be forwarded in the body in a film forwarding direction, a light blocking member, separate from said camera body that closes said opening, said light blocking member having an edge portion extending in a direction parallel to said film forwarding direction, a camera housing enclosing said camera body and said light blocking member, the camera housing including an orifice through which a film cartridge is loaded into and removed from said cartridge chamber, a lid, separate from said light blocking member, that closes and opens said orifice, a first electrical circuit being supported on said light blocking member, a second electrical circuit, separate from said first electrical circuit, being housed within said camera body, and, a resilient wiring member electrically connecting together said first electrical circuit and said second electrical circuit, wherein said wiring member is wired through said edge portion of said light blocking member, and said light blocking member being rotatable between a closed position, in which said opening is closed, and an open position, in which said opening is opened, deforming said wiring member.

8. A camera comprising:

a camera body having a film exposure portion, a cartridge chamber provided apart from said film exposure portion, and an opening at a rearward portion of said camera body, wherein film is adapted to be forwarded in the body in a film forwarding direction, a light blocking member, separate from said camera body that closes said opening, said light blocking member having with an edge portion extending in a direction parallel to said film forwarding direction, a camera housing enclosing said camera body and said light blocking member, the camera housing including an orifice through which a film cartridge is loaded into and removed from said cartridge chamber, a lid, separate from said light blocking member, that closes and opens said orifice, a first electrical circuit being supported on said light blocking member, a second electrical circuit, separate from said first electrical circuit, being housed within said camera body, and, a resilient wiring member electrically connecting together said first electrical circuit and said second electrical circuit, said camera housing further comprising a first housing member mounted on said camera body and a second housing member rotatably attached to said first housing member by a hinge portion extending in a direction parallel to said film forwarding direction, wherein said light blocking member integrally formed with said second housing member, said wiring member is wired through said edge portion of said light blocking member, and, said light blocking member being rotatable between a closed position, in which said opening is closed, and an open position, in which said opening is opened, deforming said wiring member.

* * * * *